(12) United States Patent
Brennan

(10) Patent No.: US 10,115,221 B2
(45) Date of Patent: *Oct. 30, 2018

(54) STENCIL COMPRESSION OPERATIONS

(75) Inventor: Christopher Brennan, Holden, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 3766 days.

This patent is subject to a terminal disclaimer.

(21) Appl. No.: 11/742,772

(22) Filed: May 1, 2007

(65) Prior Publication Data

US 2008/0273032 A1    Nov. 6, 2008

(51) Int. Cl.
  *G06F 12/02*    (2006.01)
  *G06T 15/00*    (2011.01)
  *G06T 1/60*    (2006.01)

(52) U.S. Cl.
  CPC ............... *G06T 15/005* (2013.01); *G06T 1/60* (2013.01)

(58) Field of Classification Search
  CPC ................................ G06T 15/005; G06T 1/60
  USPC .................................................. 345/501, 544
  See application file for complete search history.

(56) References Cited

U.S. PATENT DOCUMENTS

| | | | |
|---|---|---|---|
| 6,094,200 A | 7/2000 | Olsen et al. | |
| 6,518,974 B2 | 2/2003 | Taylor et al. | |
| 6,580,427 B1 * | 6/2003 | Orenstein et al. | 345/422 |
| 6,611,264 B1 | 8/2003 | Regan | |
| 6,636,226 B2 | 10/2003 | Morein et al. | |
| 6,646,639 B1 | 11/2003 | Greene et al. | |
| 6,894,689 B1 | 5/2005 | Greene et al. | |
| 6,999,076 B2 | 2/2006 | Morein | |
| 7,030,878 B2 | 4/2006 | Xu et al. | |
| 7,068,272 B1 | 6/2006 | Voorhies et al. | |
| 7,091,971 B2 | 8/2006 | Morein | |
| 7,126,615 B2 | 10/2006 | Liao | |
| 7,170,515 B1 | 1/2007 | Zhu | |
| 7,184,040 B1 | 2/2007 | Tzvetkov | |
| 7,277,098 B2 | 10/2007 | Xu et al. | |
| 7,369,126 B1 * | 5/2008 | Hakura | G06T 15/60 345/426 |
| 7,382,368 B1 | 6/2008 | Molnar et al. | |
| 7,589,722 B2 | 9/2009 | Morein | |
| 8,184,117 B2 * | 5/2012 | Brennan | G06T 15/405 345/420 |
| 2005/0195187 A1 | 9/2005 | Seiler et al. | |
| 2006/0033735 A1 * | 2/2006 | Seiler et al. | 345/421 |

(Continued)

OTHER PUBLICATIONS

Non-Final Office Action mailed Mar. 3, 2010 in U.S. Appl. No. 11/742,786.

(Continued)

*Primary Examiner* — Maurice L McDowell, Jr.

(74) *Attorney, Agent, or Firm* — Park, Vaughan, Fleming & Dowler LLP

(57) ABSTRACT

Described are a video graphics system, graphics processor, and methods for rendering three-dimensional objects. A buffer is partitioned into tiles. Each tile includes a plurality of pixels. Each pixel of each tile includes at least one sample. Each sample has a stencil value associated therewith. It is determined that each sample in a given tile has the same stencil value. A single stencil value is stored in the buffer for that tile. The single stencil value represents the stencil value for every sample in that tile.

13 Claims, 8 Drawing Sheets

(56) References Cited

U.S. PATENT DOCUMENTS

2006/0033743 A1    2/2006   Morein
2007/0002044 A1    1/2007   Lake et al.
2008/0068375 A1    3/2008   Min et al.

OTHER PUBLICATIONS

Non-Final Office Action mailed Apr. 27, 2010 in U.S. Appl. No. 11/742,757.
Greene, Ned et al.; "Hierarchical Z-Buffer Visibility"; Computer Graphics; 1993; 7 pages.
Final Office Action mailed Oct. 15, 2010 in related U.S. Appl. No. 11/742,757.

* cited by examiner

STENCIL COMPRESSION OPERATIONS

FIELD OF THE INVENTION

The invention relates generally to graphics processing. More particularly, the invention relates to systems and methods of accelerating three-dimensional graphics processing using hierarchical stenciling mechanisms.

BACKGROUND

For displaying three-dimensional representations of objects on a display screen, graphics-processing systems typically partition each object into geometric primitives. Geometric primitives are elementary graphics building blocks, examples of which include points, lines, images, bitmaps, vectors, and polygons. Triangles are a commonly employed form of primitives. Each primitive is stored as a set of vertices, with each vertex having associated display parameters, including color parameters, display (or pixel) location parameters, and texture parameters. Each primitive passes through a graphics pipeline. A rasterizer identifies the pixels corresponding to each primitive.

Three-dimensional scenes can have numerous objects, with many of the objects having thousands of primitives; thus, the rendering process is generally computationally intensive and complex. Often, a 3-D scene has overlapping objects. Depending upon the extent of overlap, opaque objects in the foreground can occlude a portion of or all of an object in the background. Thus, such objects may be invisible. Accordingly, an important part of the 3D rendering process is the use of depth (i.e., Z) information.

Some graphics-processing systems determine which objects are visible at a late stage in the graphics pipeline, often after determining texture and color information for the pixels. The graphics processor then discards the pixel information for the occluded object. Computing pixel information for an invisible object, therefore, is an inefficient use of processing power and unnecessarily prolongs the rendering process.

As a mechanism to reduce unnecessary computations during the 3D rendering process, graphics processing systems employ a hierarchical Z-buffering technique before rendering a pixel. The hierarchical Z-buffering technique (referred to herein as Hi-Z) entails comparing the Z values of pixels at the same (x, y) display location with a stored Z value for that location. The stored Z value represents the pixel presently deemed closest to the viewer. Pixels with a lesser Z value than the stored Z value are occluded, and are not rendered. A new pixel with a Z value that is higher than the stored Z value, however, becomes the closest (i.e., visible) pixel and is therefore rendered. In addition, and update to the Hi-Z buffer stores this new Z value to reflect the new closest pixel.

To reduce the computational load to determine possible occlusions prior to rendering, Hi-Z determinations can operate on tiles (i.e., a matrix of multiple pixels). Early Hi-Z techniques stored a far Z value for each tile. For a given incoming geometry, it could then be determined whether that a near-Z value of the geometry will fail a depth test when compared to the stored far Z value of the tile. The comparison served primarily to reject (i.e., cull) pixels that would not be drawn, thereby avoiding the inefficient process of rendering a pixel only to be later discarded.

Another means by which a pixel may be occluded is through stenciling. Similar to background pixels occluded by foreground objects, rendering pixels occluded by a stencil is wasteful. In one typical use, a stencil is a mask placed on the output scene that produces a shadow in accordance with the location of a light source. The stencil occludes pixels at the same x, y location with a smaller Z value than the stencil, i.e., it falls within the shadow. A pixel thus covered by the stencil is invisible (i.e., hidden in the shadow) and is not rendered. Shadow volumes are but one of many different exemplary uses for stencil. As an enhancement to the process of identifying stencil-occluded pixels, graphics processing systems can employ a hierarchical stencil technique that, like Hi-Z, operates on tiles of pixels. Hi-S can provide an early indication of whether the tile will pass (be rendered), will fail (be culled), or whether the outcome is unknown.

SUMMARY

In one aspect, the invention features a method of rendering three-dimensional objects. The method comprises partitioning a buffer into tiles. Each tile includes a plurality of pixels. Each pixel of each tile includes at least one sample. Each sample has a stencil value associated therewith. Each sample in a given tile is determined to have the same stencil value. A single stencil value is stored in the buffer for that given tile. The single stencil value represents the stencil value for every sample in that tile.

In another aspect, the invention features a graphics processor comprising a buffer partitioned into tiles. Each tile includes a plurality of pixels and each pixel of each tile includes at least one sample. Each sample has a stencil value associated therewith. Processor logic determines that each sample in a given tile has the same stencil value and stores a single stencil value in the buffer for that given tile. The single stencil value represents the stencil value for every sample in that tile.

In still another aspect, the invention features a video graphics system comprising a graphics processor for communication with a display. The graphics processor includes a buffer partitioned into tiles. Each tile includes a plurality of pixels. Each pixel of each tile includes at least one sample. Each sample has a stencil value associated therewith. Processor logic determines that each sample in a given tile has the same stencil value and stores a single stencil value in the buffer for that tile. The single stencil value represents the stencil value for every sample in that tile.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Graphics-processing systems can employ various mechanisms, described herein, to accelerate the processing rate of depth (Z) and stencil operations, such as those used in stencil shadow values, in Z-only pre-passes, in shadow-depth map generation, and in various applications of computation masking. One such mechanism, referred to as "Fast Z", bypasses detail rasterization for a tile of pixels if a hierarchical Z test (herein called Hi-Z) determines that a primitive fully covers the tile and that the tile passes the Hi-Z test (i.e., the old Z data will be overwritten). In addition, the Fast Z mechanism can employ a compression mechanism for storing a representation of the Z data of each sample of the tile.

Another mechanism, called "Fast Stencil", can also be used to bypass detail rasterization for a tile of pixels. Fast Stencil operations perform a hierarchical stencil test (herein called Hi-S) to determine whether a primitive fully covers the tile and whether all samples of the tile will undergo the same stencil operation. If either of two other conditions is also satisfied, then an update to the stencil values in the frame buffer for the tile can be performed without detail rasterization. These conditions are (1) the old stencil values are to be entirely overwritten, or (2) a single stencil value represents the stencil values for all samples of the tile. Fast Stencil operations capitalize on a stencil compression technique, described herein, that determines when every sample of a given tile have the same stencil value and consequently reduces these stencil values to a single stencil value.

Figure 1:
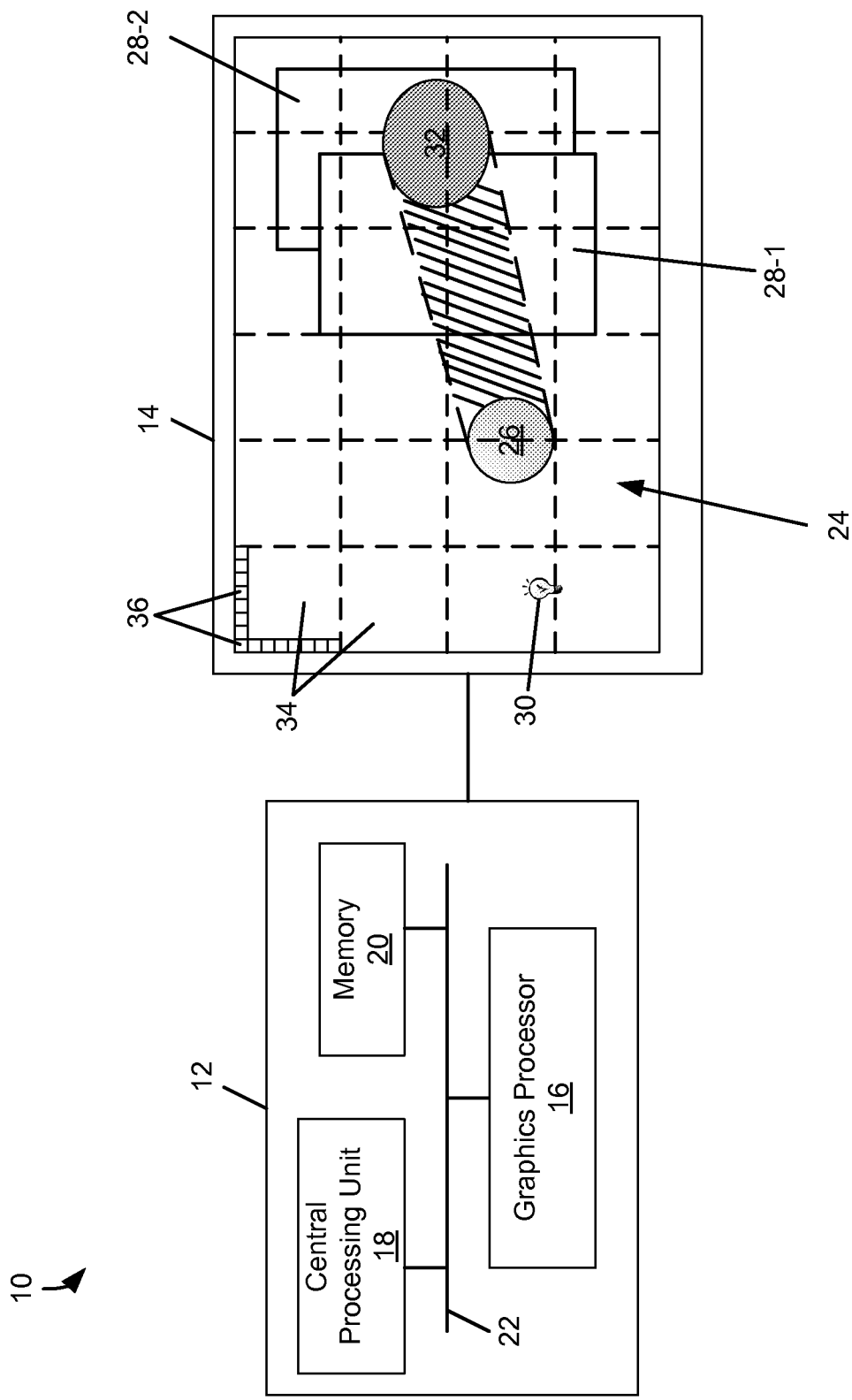
FIG. 1 is an embodiment of a graphics-processing system constructed in accordance with the invention, the graphics-processing system including a graphics processor and a display screen.

FIG. 1 shows an embodiment of a graphics processing system 10 including a computing system 12 in communication with a display screen 14. The computing system 12 includes a graphics-processing unit 16, a central processing unit (CPU) 18, and memory 20, each connected to a system bus 22. Various examples of computing systems within which the present invention may be embodied include, but are not limited to, personal computers (PC), Macintosh computers, workstations, laptop computers, server systems, hand-held devices, and game consoles.

The memory 20 includes non-volatile computer storage media, such as read-only memory (ROM), and volatile computer storage media, such as random-access memory (RAM). Within the RAM are program code and data (i.e., graphics information). Program code includes, but is not limited to, application programs, a graphics library, and an operating system (e.g., Windows 95™, Windows 98™, Windows NT 4.0, Windows XP™, Windows 2000™, Vista™, Linux™, SunOS™, and MAC OS™). Examples of application programs include, but are not limited to, stand-alone and networked video games, simulation programs, word processing programs, and spreadsheet programs.

The display screen 14 can be any device suitable for displaying computer-graphics generated images. Examples of display screens include, but are not limited to, computer monitors, television monitors, liquid crystal displays (LCD), and cathode ray tube displays. In the example shown, a three-dimensional image 24 comprised of a spherical object 26 and planar objects 28-1, 28-2 (generally, 28) appears on the display screen 14. A light source 30 disposed on one side of the spherical object 26 causes the object 26 to cast a shadow 32 onto the planar objects 28. Accordingly, the image 24 is an example of a display in which portions of objects are not visible because of shadow or because of an opaque object in its foreground.

The display screen 14 is partitioned into a plurality of regions or tiles 34. Each tile 34 corresponds to a matrix of display pixels 36. To increase computing efficiency, certain graphics computations can operate on tiles rather than on individual pixels or samples. In the example shown, each tile 34 is an 8×8 matrix of pixels. Tiles 34 can have other sizes (e.g., 4×4, 4×8, and 8×4) without departing from the principles of the invention.

In brief overview, the graphics-processing unit 16 receives graphics commands from the CPU 18 and graphics information from the memory 20. Based on the received commands and graphics information, the graphics-processing unit 16 generates the image 24 that appears on the display screen 14. Devices other than the memory 20 can operate as input sources of graphics information. The present invention accelerates the 3D rendering process by identifying tiles of pixels that can bypass detail rasterization.

Figure 2:
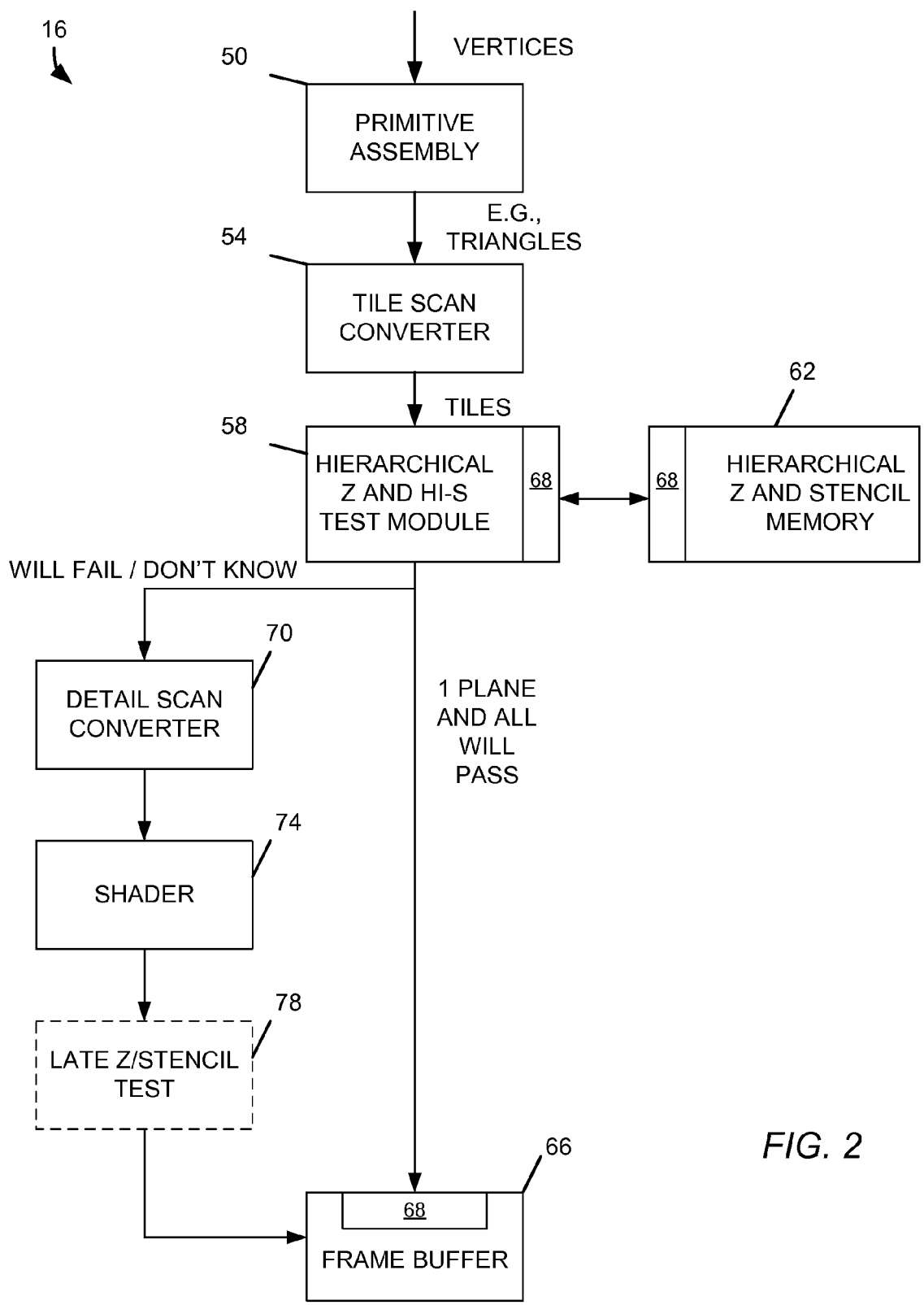
FIG. 2 is a functional block diagram representation of a portion of an embodiment of the graphics processor in accordance with the invention.

FIG. 2 shows an embodiment of the graphics-processing unit 16 including a primitive assembly 50, a tile scan converter 54, and a hierarchical Z (Hi-Z) and stencil test module 58 in communication with a Hi-Z and stencil cache 62 and with a frame buffer 66. In general, the frame buffer 66 is video memory allocated to hold the graphics information for the pixels from which the video display (i.e., frame) is drawn. In addition, each pixel of the frame buffer 66 is comprised of one or more samples (i.e., sub-pixels).

Each tile 34 of the display screen 14 maps to a tile of pixels (and samples) in the frame buffer 66. The graphics information for each sample of each pixel to be drawn on the display screen 14 includes a color value, a depth (Z) value, and a stencil value. Instead of incorporation within the frame buffer 66, a separate Z-buffer for holding Z values and a separate stencil buffer for holding stencil values may be used without departing from the principles of the invention.

The graphics-processing unit 16 also includes a detail scan converter 70, a shader 74, and an optional late Z and stencil test module 78. In one embodiment, an application-specific integrated circuit (ASIC) chip or chipset embodies the graphics-processing unit 16.

Each of the various modules (e.g., 58, 62, 66) of the graphics processing unit 16 includes processor logic, which may be comprised of circuitry, software, or a combination thereof, for executing the particular functionality of that module. In FIG. 2, such processor logic is generally denoted as reference numeral 68.

During operation, the primitive assembly 50 receives vertices of graphics information and from such vertices produces graphics primitives (e.g., triangles). From primitives received from the primitive assembly 50, the tile scan converter 54 identifies each tile fully or partially covered by a given primitive. Associated with each tile is a set of (x, y) coordinate locations (corresponding to the pixels and samples in the tile) and a z-plane equation representative of the plane within which the primitive lies. In one embodiment, the z-plane equation includes a point, i.e., an (x, y) coordinate location within the plane of the primitive, and a pair of slopes, dx/dz and dy/dz. The z-plane equation enables derivation of a Z value for each sample of the tile.

The tile scan converter 54 sends the (x, y) coordinate locations and z-plane information of the tile to the Hi-Z and Hi-S test module 58. The Hi-Z and Hi-S test module 58 determines whether the tile is fully covered by the primitive (i.e., every sample of the tile is within the z-plane representing the primitive).

Associated with each tile are a minimum Z value and a maximum Z value, each derived from the smallest depth value and the largest depth value, respectively, of all samples in the tile. Together, the minimum Z and maximum Z values specify a range of Z values within a particular tile.

The Hi-Z and Hi-S memory 62 stores tiles (referred to as H-tiles). There is a one-to-one correspondence between the H-tiles and tiles of the frame buffer 62. Each H-tile has a minimum Z value, a maximum Z value, a stencil value range, and a stencil flag, which together provide a compressed representation of the Z and stencil values stored in the frame buffer 66 for the corresponding tile. This compressed representation enables a coarse testing of the corresponding tile.

The Hi-Z and Hi-S test module 58 communicates with the Hi-Z and stencil memory 62 to retrieve the hierarchical Z value range, stencil value range, stencil flag, or combinations thereof, for the H-tile corresponding to an incoming tile under test. With the retrieved hierarchical Z value range and stencil information (i.e., stencil value range and flag), the Hi-Z and Hi-S test module 58 determines whether the tile being tested will fail (will not be drawn), will pass (a likelihood to be drawn), or if the outcome is unknown (not determinable). The basis for passing or failing a given tile can be on the stencil test alone, on the Z test alone, or on a combination of the two. Techniques for comparing an incoming tile with its corresponding H-tile to determine whether that tile passes, fails, or is indeterminable are described in Seiler et al., U.S. application Ser. No. 10/790,953, titled "Method and Apparatus for Hierarchical Z Buffering and Stenciling", the entirety of which application is incorporated by reference herein. Some embodiments of graphics-processing systems perform such testing on "quad tiles", i.e., a 4×4 quad tile for an 8×8 tile, and operate on four such quad tiles in parallel.

If the primitive fully covers tested tile and the outcome of the test is that the tile will pass, the processing of tiles can proceed directly from the Hi-Z and Hi-S test module 58 to the writing of Z and stencil values to the frame buffer 66. In effect, the processing bypasses the detail rasterization associated with the detail scan converter 70, shader 74, and test module 78 branch of the graphics pipeline. By passing the detail rasterization, the graphics operations can take place at the tile level (i.e., work with units of tiles), rather than at the pixel or sample levels (as is done at the shader 74 and z/stencil test module 78).

If the primitive does not fully cover the tile, or if the outcome of the test is unknown or that the tile will fail, the processing of the tile proceeds to the detail scan converter 70. The detail scan converter 70 determines those pixels of a tile that are fully or partially covered by the primitive, and produces a sample mask for each fully or partially covered pixel. In general, the shader 74 includes program code for determining a final color and z-value for a pixel, often adding complex shading effects, e.g., texture mapping and transparency, to the appearance of an object. To implement shading effects, the shader 74 may communicate with a texture block in order to add a texture to the pixels being rendered. An optional late Z and stencil test module 78 can be used to test the visibility of pixels.

Graphics information for the pixels continuously passes to the frame buffer 66, e.g., from the late depth and stencil test module or from the Hi-Z and Hi-S test module 58, until the frame buffer 66 receives a full frame of graphics information. At that time, the frame buffer 66 may provide the completed frame to an output device, such as the display screen 14.

FIGS. 3A-3D show exemplary representations of a tile, comprised of an 8×8 matrix of pixels, as stored in the frame buffer 66. In general, each tile representation includes a stencil value (e.g., 8-bit) for each sample in the tile and a z-plane value (e.g., 96 bit) for each primitive covering at least one sample in the tile. For tile representations having more than one plane, a mask comprised of one or more bits (herein called Pmask) associates each sample to one of the planes. For example, a single bit per sample can be used to distinguish between two z-planes, two bits per sample for distinguishing among as many as 4 z-planes, and three bits per sample for distinguishing among as many as 8 z-planes. The Z data for a given sample can be derived from the z-plane to which that sample points. As described in more detail below, a single stencil value, a single z-plane value, or both can be used to represent the stencil values and Z values for all samples in a tile.

Figure 3A:
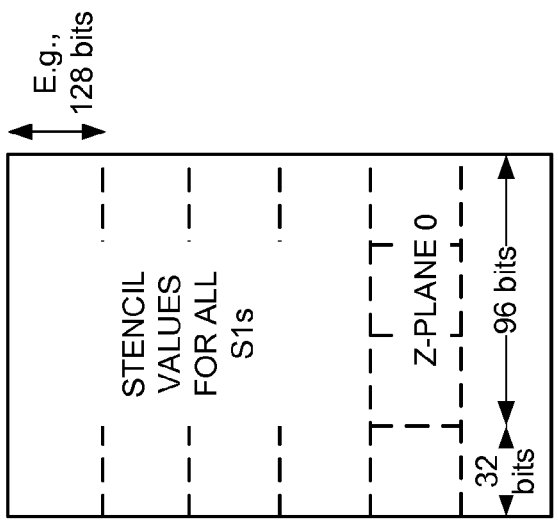
FIG. 3A is a block diagram of an embodiment of an exemplary tile representation as stored in buffer memory, the tile being comprised of an 8×8 matrix of pixels and represented by a single z-plane, each pixel of the tile comprising one sample.

FIG. 3A shows a particular exemplary representation of an 8×8 pixel tile for which each pixel has one sample (S1). Each sample has an 8-bit stencil value (the size of the stencil value being exemplary). Accordingly, 512 bits (64 samples*8-bits) of frame buffer memory hold stencil values for this particular tile. In addition, all samples are associated with the same z-plane (z-plane 0), which is a condition that occurs when a primitive fully covers a tile that is then written to the frame buffer, as described herein in connection with FIG. 4. Here, for example, 96 bits hold the pointer to the z-plane 0. Because all samples refer to the same z-plane, no PMASK is needed to identify the particular z-plane to which each sample points.

Figure 3B:
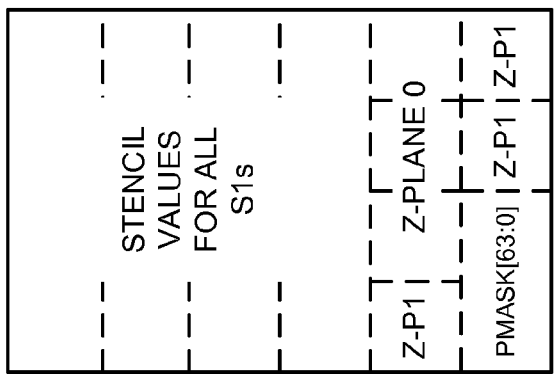
FIG. 3B is a block diagram of an embodiment of an exemplary tile representation as stored in buffer memory, the tile being comprised of an 8×8 matrix of pixels and represented by two planes, each pixel comprised of one sample.

FIG. 3B shows an exemplary representation of an 8×8 pixel tile representation similar to that shown in FIG. 3A, except that in FIG. 3B samples (S1) correspond to two different z-planes. The tile representation includes pointers to each z-plane (here, z-p1 and z-plane 0), each stored as a 96-bit value. A 64-bit PMASK, 1 bit for each of the 64 samples, identifies to which of the two z-planes each sample corresponds.

Figure 3C:
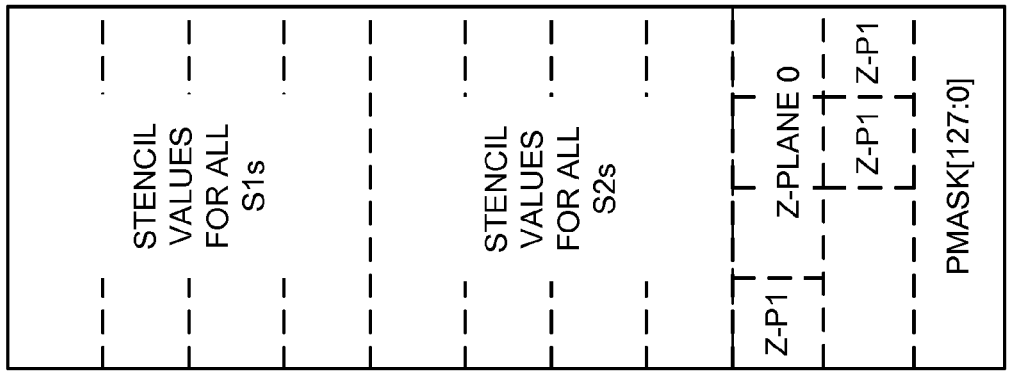
FIG. 3C is a block diagram of an embodiment of an exemplary tile representation as stored in buffer memory, the tile being comprised of an 8×8 matrix of pixels and represented by two planes, each pixel comprised of two samples.

FIG. 3C shows an embodiment of an 8×8 pixel tile representation similar to that shown in FIG. 3B, except that in FIG. 3C each pixel has two samples (S1, S2). Accordingly, 1024 bits (128 samples*8-bits) of the frame buffer memory 66 hold stencil values, and a 128-bit PMASK, 1 bit for each of the 128 samples, identifies to which of the two z-planes each sample corresponds.

With an increase in the number of samples per pixel, there is a corresponding increase in frame buffer memory for storing the stencil values associated with the samples. For examples, for eight samples per pixel, to hold stencil values for each sample requires 4096 bits (64 pixels*8 samples/pixels*8-bits/sample). A stencil compression technique, described below in connection with FIG. 5 and FIG. 6, can reduce the amount of memory (and improve bandwidth) needed to represent the stencil values of all samples in a tile.

Fast Z Operation

Figure 4:
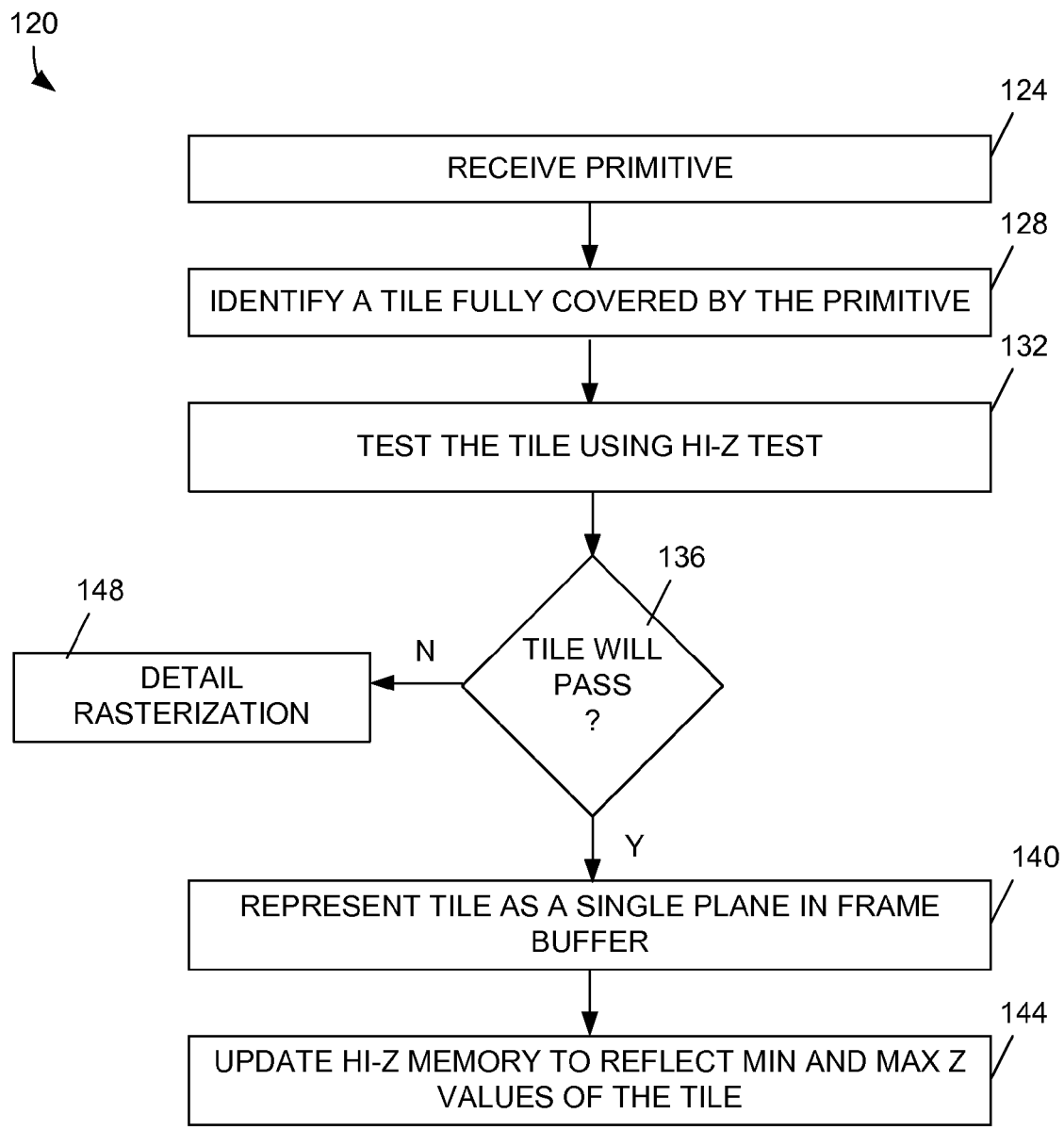
FIG. 4 is a flow diagram representation of an embodiment of a process for accelerating 3D rendering using hierarchical Z buffering in accordance with the invention.

FIG. 4 shows an embodiment of a Fast Z process 120 for accelerating depth (Z) processing in accordance with the invention. Performance of the Fast Z process 120 may or may not occur in conjunction with a Fast stencil process, described below. In the description of the process 120, reference is also made to FIG. 2. To illustrate that the graphics-processing system can implement the Fast Z process 120 without implementing stencil operations, the description refers to the Hi-Z and Hi-S test module 58 as Hi-Z test module 58' and to the Hi-Z and Hi-S memory 62 as Hi-Z memory 62'.

At step 124, the tile scan converter 54 receives a primitive from the primitive assembly 50. The tile scan converter 54 scans through the tiles to identify (step 128) each tile covered fully by the primitive (i.e., no portion of the tile falls outside the perimeter of the primitive). At step 132, the Hi-Z test module 58' compares a fully covered tile with its corresponding H-tile to determine if the tile will pass, will fail, or if the outcome is unknown, as described above.

If the Hi-Z test module 58' determines (step 136) that the fully covered tile will pass, this indicates that the old Z data for the tile within the frame buffer 66 can be replaced. At step 140, processor logic (i.e., circuitry, software, or both) replaces the old Z data by writing a single z-plane value to the frame buffer 66 for the tile, i.e., the z-plane corresponding to the plane of the primitive that fully covered the tile. Writing a single z-plane value to the frame buffer 66 can have the memory-saving effect of reducing a list of multiple z-planes to a single z-plane. In addition, the writing and reading of the single z-plane value can take place within a single clock cycle. Further, the processor logic may update the graphics information (i.e., depth values, and/or stencil values) for each pixel sample of the tile with the values described by the single z-plane.

This updating of the frame buffer bypasses detail rasterization (FIG. 2), and thereby accelerates the generation of the complete frame. In addition, the Hi-Z test module 58' updates (step 144) the minimum Z and maximum Z data in the corresponding H-tile within the Hi-Z memory 62' to reflect the Z data of the fully covered tile and to indicate that the corresponding H-tile has only one z-plane. If instead, the Hi-Z test module 58' determines that the tile will fail or if the outcome is unknown, the tile undergoes (step 148) detail rasterization.

Fast Z operations can be used to perform "Fast Clear" operations. In brief overview, a graphics-processing system can use fast clear operations to clear or reset the data stored in the frame buffer to a default Z and default stencil values. To effect a Fast Clear operation, the graphics-processing system provides a primitive that fully covers all tiles in the frame buffer. The design of this primitive ensures it to be "visible" (i.e., to pass Hi-Z and Hi-S tests). Accordingly, when processing this primitive, the graphics-processing system determines that the primitive covers every tile fully and, after bypassing detail rasterization, overwrites each tile in the buffer with a single z-plane equation and single stencil value. Although described as a mechanism for clearing Z data and stencil values concurrently, Fast Clear operations can be adapted to perform a clear of Z data without affecting stencil values or a clear of stencil values without affecting Z data.

Stencil Value Compression

In many 3-D scenes, shadows obscure but a minor portion of the scene. Accordingly, large sections of a scene are not in shadow, and for those tiles corresponding to those sections, the stencil values of the samples can show little if any variation. Even for those tiles corresponding to sections that are in shadow, every sample within a given tile can often have the same stencil value. This principle is generally applicable also for non-shadow uses of stencil. For one, stencil is generally considered to mark a region, not to contain continuous varying information about the object beneath or behind it. In addition, currently no technique exists to vary the stencil source data across an object and, therefore, it is uncommon to have an object with multiple stencil values without intersecting several stencil operations.

Figure 5:
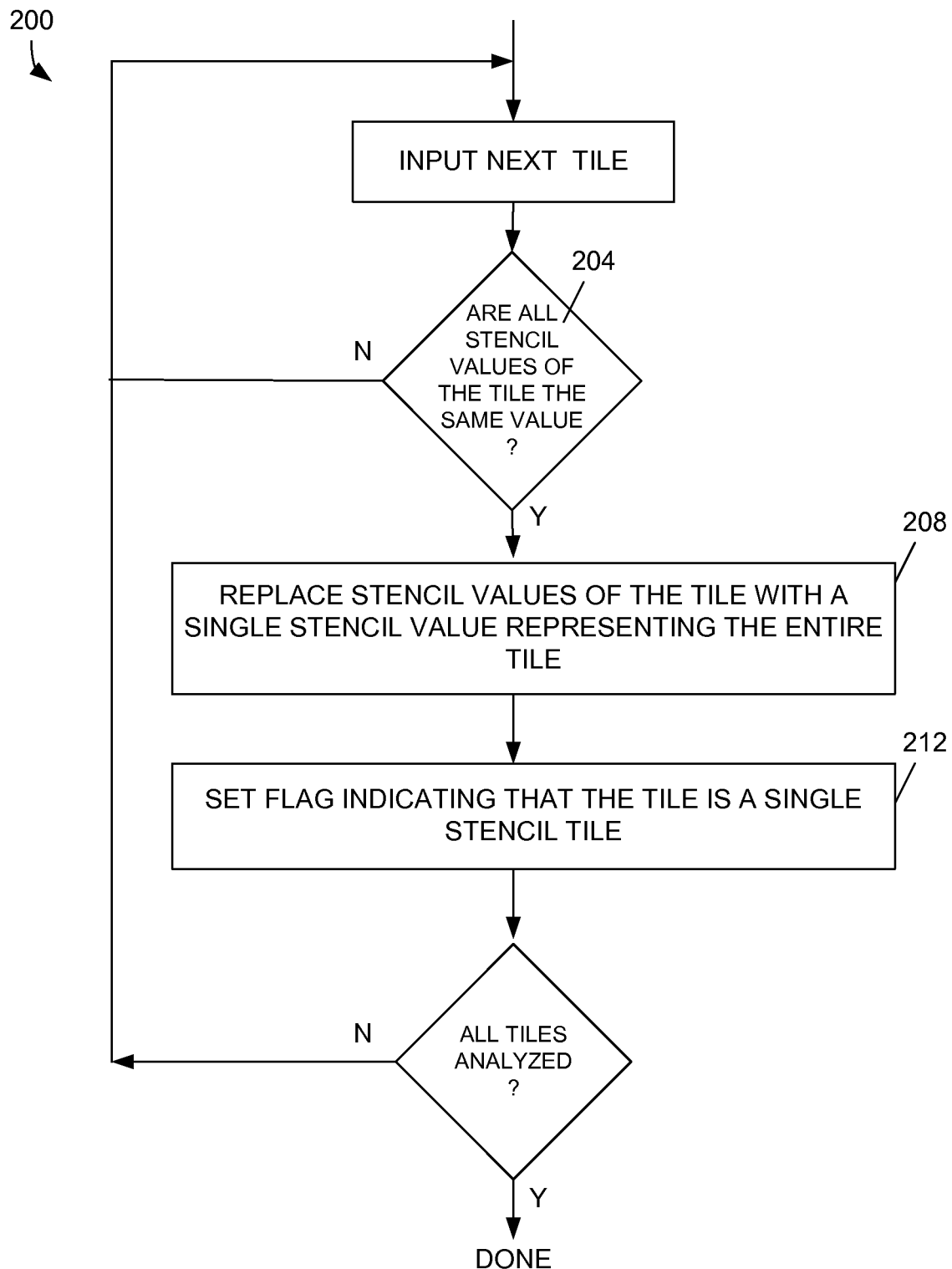
FIG. 5 is a flow diagram representation of an embodiment of a process for compressing stencil values of a tile into a single stencil value in accordance with the invention.

FIG. 5 shows an embodiment of a process 200 for compressing stencil values for a tile in accordance with the invention. Stencil value compression can advantageously reduce the amount of frame buffer memory needed to store stencil values and enable Fast Stencil operations, described below. Graphics-processing systems may or may not implement stencil value compression in conjunction with the above-described Fast Z operations. In addition, although Fast Stencil operations use the results produced by stencil value compression, graphics-processing systems can implement stencil value compression without implementing Fast Stencil operations. In the description of the compression process 200, reference is also made to FIG. 2.

In brief overview, stencil value compression capitalizes on the recognition that, for many tiles in the frame buffer, the samples within any given tile may all have the same stencil value. Upon encountering such a tile, the process 200 reduces the stencil values of the samples in the tile to a single stencil value. This single stencil value represents the stencil value of every sample in the tile, irrespective of the number of samples that the tile has. An advantage of the resulting single stencil value is that its size, in terms of used memory space, enables reading and writing operations performed on this stencil value to occur in a single clock cycle of the graphics processor.

In more specific overview, processor logic determines (step 204), for each tile in the frame buffer 66, whether the stencil values for all samples in that tile have the same stencil value. For each tile in which all stencil values for the tile are the same stencil value, the processor logic replaces (step 208) all of the stencil values stored in the frame buffer 66 with a single stencil value (i.e., the stencil value that is common to all samples in the tile). In addition, the processor logic sets a flag (step 212) to mark that tile as a single-stencil tile (i.e., a tile for which a single stencil value represents the stencil value of every sample in the tile). The single stencil value and the flag may be stored together or separately in the frame buffer 66 with the tile, in the Hi-Z and Hi-S memory 62, or in both.

Figures 6A, 6B:
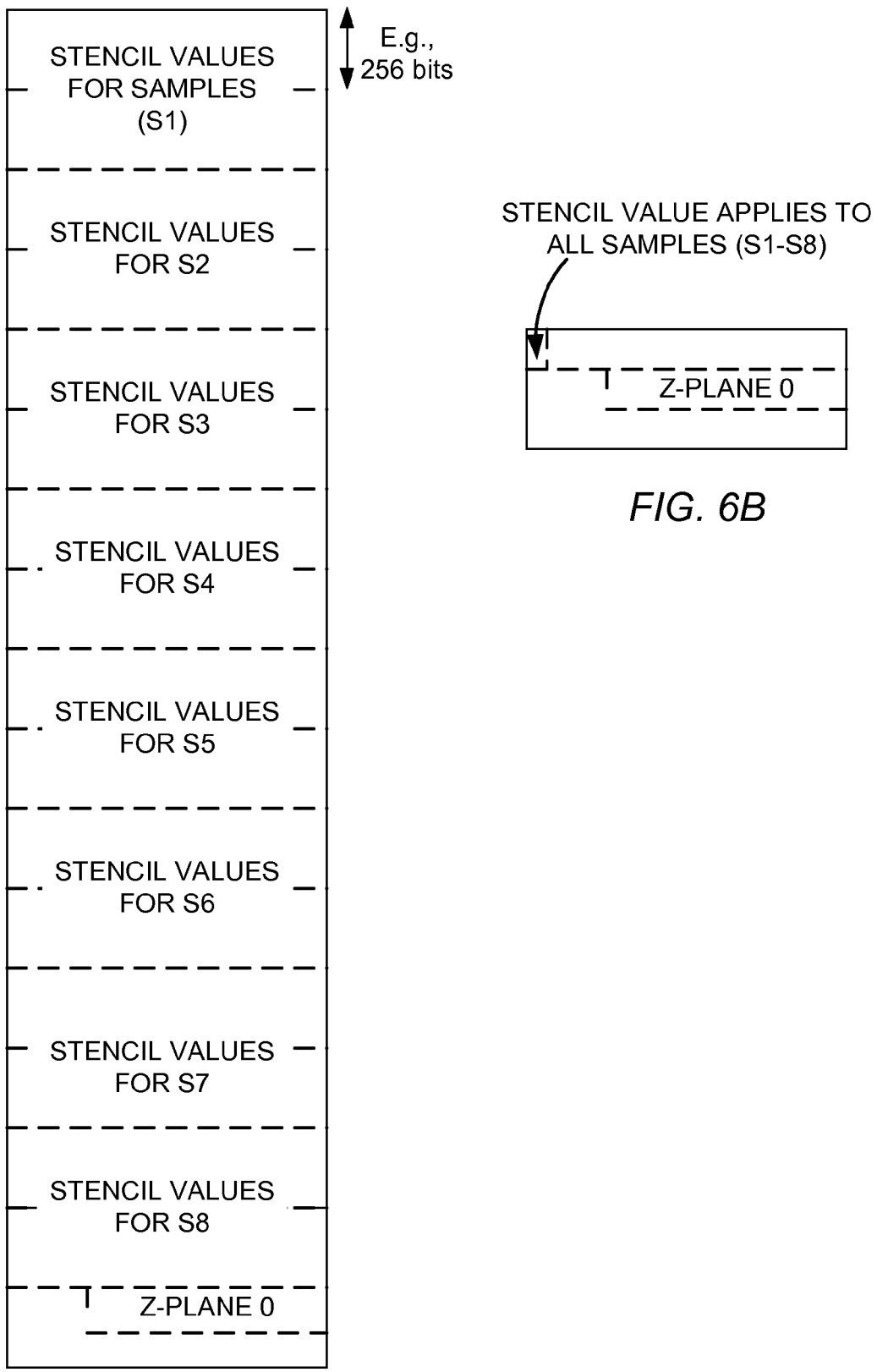
FIG. 6A is a block diagram of an embodiment of an exemplary tile representation as stored in buffer memory for a tile comprised of an 8×8 matrix of pixels, each having eight samples, and represented by one z-plane.
FIG. 6B is a block diagram of the exemplary tile representation of FIG. 6B after stencil value compression.

FIG. 6A and FIG. 6B illustrate an example of saved memory achieved by the stencil value compression process 200 described in FIG. 5. FIG. 6A shows an exemplary representation of an 8×8 pixel tile before stencil value compression. Here, e.g., each pixel in the tile has eight samples, with each sample having an associated 8-bit stencil value. Accordingly, 4096 bits (64 pixels*8 samples/pixel*8-bits/stencil value) of the memory 62 hold stencil values for this particular tile. To simplify the illustration, all samples are associated with the same z-plane (z-plane 0), which is represented as a 96-bit value. FIG. 6B shows the 8×8 pixel tile after stencil value compression. As shown, the tile has one 8-bit stencil value only, which applies to every sample in the tile. In addition, the stencil value compression, in effect, enables a single memory access (e.g., within a 32-bit cache line) to write or read the single stencil value.

Fast Stencil Operation

Figure 7A:
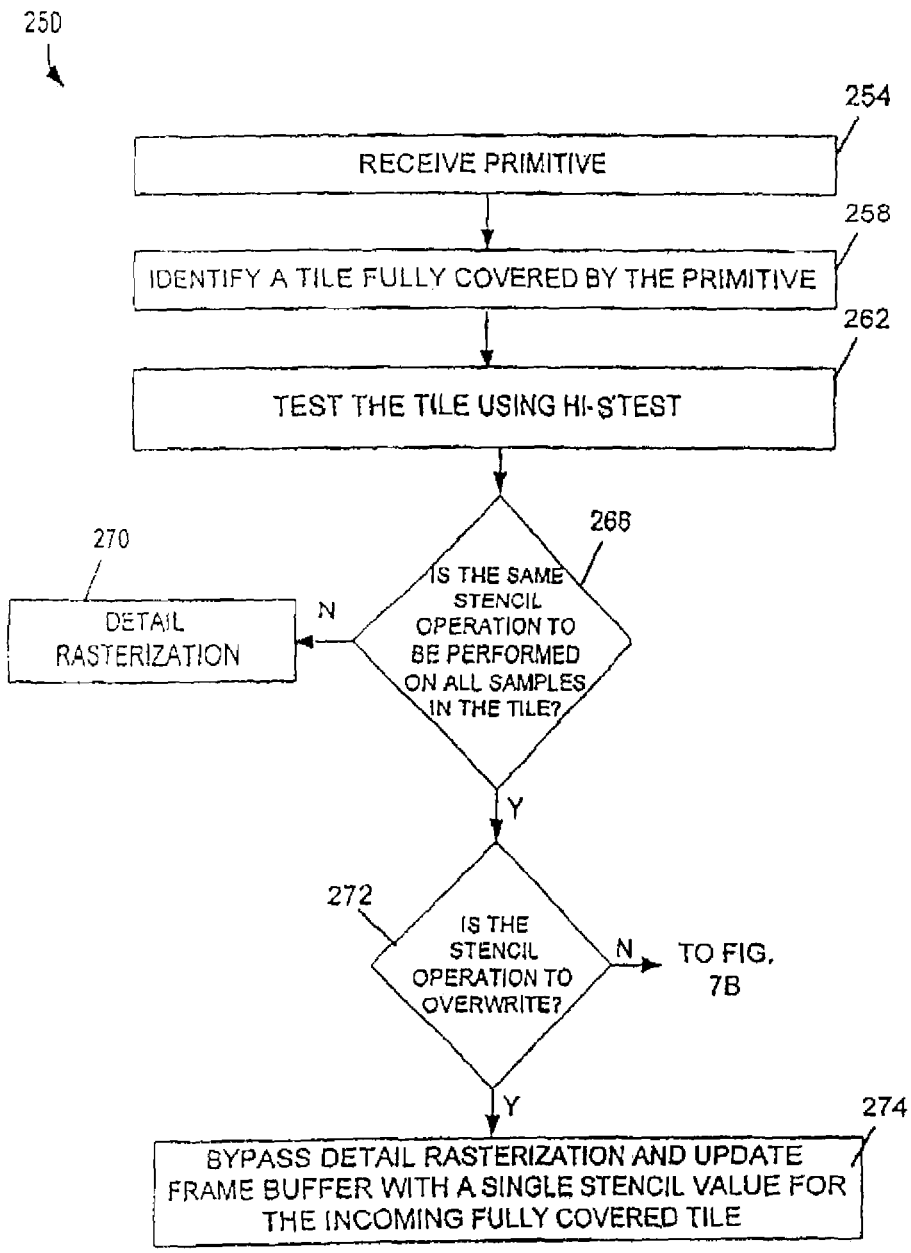
FIG. 7A and FIG. 7B are a flow diagram representation of an embodiment of a process for performing fast stencil operations in accordance with the invention.
Figure 7B:
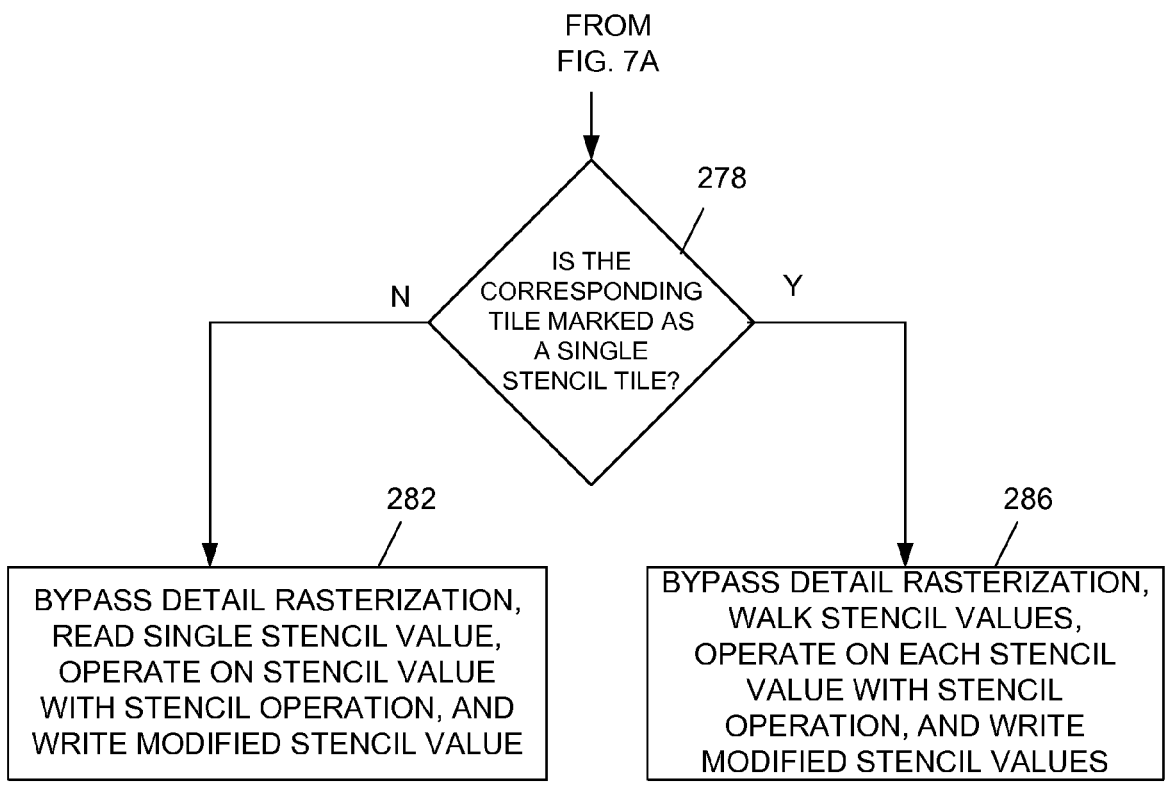

The ability to represent the stencil values of every sample in a tile with a single stencil value, in addition to the saving memory and improving bandwidth, also enables a Fast Stencil operation that can avoid detail rasterization for a tile of pixels. FIGS. 7A and 7B show an embodiment of a process 250 for performing Fast Stencil operations in accordance with the invention. Performance of the Fast Stencil process 250 may or may not occur in conjunction with a Fast Z process. To illustrate that a graphics-processing system can implement the Fast Stencil process 250 independently of or without implementing Z operations (e.g., Fast Z), the description refers to the Hi-Z and Hi-S test module 58 as Hi-S test module 58" and to the Hi-Z and Hi-S memory 62 as Hi-S memory 62".

At step 254, the tile scan converter 54 receives a primitive from the primitive assembly 50. The tile scan converter 54 scans through the tiles to identify a tile (step 258) covered fully by the primitive. At step 262, the Hi-S test module 58" tests the fully covered tile, as described above, and determines (step 266) whether the stencil values for all samples of the tile are to undergo the same stencil operation. If the result of the test is the tile will not pass or the outcome is unknown, or if different samples are to undergo different stencil operations, then the tile undergoes (step 270) detail rasterization (for stencil).

If the tile passes the test, and the Hi-S test module 58" determines that the same stencil operation applies to all stencil values, then the particular type of stencil operation determines the action taken. As described above, the particular stencil operation depends upon the results of the test executed by the Hi-S test module 58". If, at step 272, the particular stencil operation is to replace the existing stencil values in the frame buffer 66 for the fully covered tile, then processor logic replaces (step 274) the old stencil values (or single value) with a single stencil value (e.g., a stencil reference value) associated with the incoming tile, thereby bypassing detail rasterization.

If, instead, the particular stencil operation is anything other than to replace the existing stencil values, e.g., increment, decrement, invert, keep, increment_clamp, decrement_clamp, processor logic determines (step 278) whether the fully covered tile is marked as a single stencil tile. The processor logic makes this determination by referring to the flag associated with the tile, whether the flag resides in the Hi-S memory 62" or in the frame buffer 66.

If the tile is a single stencil tile, the processor logic performs (step 282) the particular stencil operation on the single stencil value stored in the frame buffer 66 for that tile. For example, if the stencil operation is to increment, then the processor logic reads the single stencil value, increments the single stencil value, and writes the incremented stencil value back to the frame buffer 66. This single modified stencil value continues to represent each sample in the tile. In addition, the rendering process is again able to bypass detail rasterization.

If the tile in the frame buffer is not a single stencil tile (i.e., different samples have different stencil values), the processor logic (e.g., a walker engine) walks (step 286) through the stencil values of the entire tile, performs the particular stencil operation individually on each stencil value, and writes the modified stencil values back to the frame buffer 66. Although the writing of individual stencil values is not as optimized as writing a single stencil value for the whole tile, the ability to bypass detail rasterization provides a measure of optimization.

Although described herein predominantly as hardware, embodiments of the described invention may be implemented in hardware (digital or analog), software (program code), or combinations thereof. Program code implementations of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims. For example, although described above as separately operational processes, the Fast Z and Fast Stencil processes can be implemented together in a graphics-processing system.

What is claimed is:

1. A method of rendering three-dimensional objects, the method comprising:
partitioning a buffer into tiles, each tile including a plurality of pixels, each pixel of each tile including at least one sample, each sample having a stencil value associated therewith;
determining that each sample in a given tile has the same stencil value;
bypassing detail rasterization, removing stencil values individually associated with each sample in the tile from the buffer, and replacing the removed stencil values with a single stencil value representing the stencil value for every sample included in the tile; and
storing the single stencil value in the buffer for that tile, the single stencil value representing the stencil value for every sample in that tile.

2. The method of claim 1, further comprising the step of setting a flag to indicate that the given tile is a single stencil tile in which the stencil value of every sample in the tile is represented by a single stencil value.

3. The method of claim 2, further comprising the step of storing, in a hierarchical stencil memory, a hierarchical tile that corresponds to the given tile, storing the flag in the hierarchical stencil memory, and associating the flag with the given tile.

4. The method of claim 2, further comprising the step of storing the flag in the buffer.

5. A graphics processor comprising:
a buffer partitioned into tiles, each tile including a plurality of pixels, each pixel of each tile including at least one sample, each sample having a stencil value associated therewith;
processor logic determining that each sample in a given tile has the same stencil value, and storing a single stencil value in the buffer for that tile, the single stencil value representing the stencil value for every sample in that tile, wherein the processor logic bypasses detail rasterization, removes stencil values individually associated with each sample in the tile from the buffer, and replaces the removed stencil values with a single stencil value in the buffer representing the stencil value for every sample included in the tile.

6. The graphics processor of claim 5, further comprising wherein the processor logic sets a flag to indicate that the given tile is a single stencil tile in which the stencil value of every sample in the tile is represented by a single stencil value.

7. The graphics processor of claim 6, further comprising a hierarchical stencil memory storing a hierarchical tile that corresponds to the given tile, and wherein the flag is stored in the hierarchical stencil memory and associated with the given tile.

8. The graphics processor of claim 6, wherein the flag is stored in the buffer.

9. A video graphics system comprising:
a graphics processor for communication with a display, the graphics processor including:
a buffer partitioned into tiles, each tile including a plurality of pixels, each pixel of each tile including at least one sample, each sample having a stencil value associated therewith;
processor logic determining that each sample in a given tile has the same stencil value, and storing a single stencil value in the buffer for that tile, the single stencil value representing the stencil value for every sample in that tile, wherein the processor logic bypasses detail rasterization, removes stencil values individually associated with each sample in the tile from the buffer, and replaces the removed stencil values with a single stencil value in the buffer representing the stencil value for every sample included in the tile.

10. The video graphics system of claim 9, further comprising wherein the processor logic sets a flag to indicate that the given tile is a single stencil tile in which the stencil value of every sample in the tile is represented by a single stencil value.

11. The video graphics system of claim 10, further comprising a hierarchical stencil memory storing a hierarchical tile that corresponds to the given tile, and wherein the flag is stored in the hierarchical stencil memory and associated with the given tile.

12. The video graphics system of claim 10, wherein the flag is stored in the buffer.

13. The video graphics system of claim 9, further comprising the display.

* * * * *